US012196014B2

(12) United States Patent
Bendel et al.

(10) Patent No.: US 12,196,014 B2
(45) Date of Patent: Jan. 14, 2025

(54) MOTOR VEHICLE LOCK, IN PARTICULAR MOTOR VEHICLE DOOR LOCK

(71) Applicant: Kiekert AG, Heiligenhaus (DE)

(72) Inventors: Thorsten Bendel, Oberhausen (DE); Christian Sturm, Krefeld (DE); Martin Lindmayer, Sulz a.N. (DE); Tobias Konrad, Böblingen (DE)

(73) Assignee: Kiekert AG, Heiligenhaus (DE)

(*) Notice: Subject to any disclaimer, the term of this patent is extended or adjusted under 35 U.S.C. 154(b) by 275 days.

(21) Appl. No.: 17/632,933

(22) PCT Filed: Jul. 28, 2020

(86) PCT No.: PCT/DE2020/100673
§ 371 (c)(1),
(2) Date: Feb. 4, 2022

(87) PCT Pub. No.: WO2021/023341
PCT Pub. Date: Feb. 11, 2021

(65) Prior Publication Data
US 2022/0290469 A1 Sep. 15, 2022

(30) Foreign Application Priority Data
Aug. 7, 2019 (DE) ..................... 10 2019 121 300.2

(51) Int. Cl.
*E05B 81/82* (2014.01)
*E05B 81/06* (2014.01)
(Continued)

(52) U.S. Cl.
CPC .............. *E05B 81/82* (2013.01); *E05B 81/06* (2013.01); *E05B 81/14* (2013.01); *E05B 81/48* (2013.01); *E05B 81/50* (2013.01)

(58) Field of Classification Search
CPC .......... E05B 81/82; E05B 81/06; E05B 81/14; E05B 81/48; E05B 81/50
(Continued)

(56) References Cited

U.S. PATENT DOCUMENTS 11,236,533 B2 * 2/2022 Tamura .................... E05B 77/36
2003/0164616 A1 * 9/2003 Belmond ................ E05B 77/30 292/201
(Continued)

FOREIGN PATENT DOCUMENTS

DE 8809256 U1 9/1988
DE 19710531 A1 * 9/1998 ............. E05B 77/12
(Continued)

OTHER PUBLICATIONS

International Search Report mailed Nov. 10, 2020, for priority International Patent Application No. PCT/DE2020/100673.

*Primary Examiner* — Eugene G Byrd
*Assistant Examiner* — James Edward Ignaczewski
(74) *Attorney, Agent, or Firm* — Renner, Otto, Boisselle & Sklar, LLP

(57) ABSTRACT

A motor vehicle lock, in particular a motor vehicle door lock, which is equipped with an electromotive drive for an actuation lever chain and in particular locking lever chain. An emergency energy store for providing electrical power to the drive in the event of emergency activation and in particular emergency unlocking is also provided. In accordance with the invention, the drive, for emergency actuation and in particular emergency unlocking, acts on the actuation lever chain or locking lever chain against the force of a restoring spring.

16 Claims, 2 Drawing Sheets

(51) Int. Cl.

| | |
|---|---|
| ***E05B 81/14*** | (2014.01) |
| ***E05B 81/48*** | (2014.01) |
| ***E05B 81/50*** | (2014.01) |

(58) Field of Classification Search
USPC .......................................................... 292/201
See application file for complete search history.

(56) References Cited

U.S. PATENT DOCUMENTS

| | | | | |
|---|---|---|---|---|
| 2004/0058563 | A1* | 3/2004 | Kobayashi | E05B 83/40 439/25 |
| 2011/0107800 | A1* | 5/2011 | Barbier | E05B 77/28 70/237 |
| 2019/0316388 | A1* | 10/2019 | Götzen | E05B 81/40 |
| 2020/0095809 | A1* | 3/2020 | Yong | E05B 81/06 |
| 2020/0332574 | A1* | 10/2020 | Ney | E05B 81/42 |

FOREIGN PATENT DOCUMENTS

| | | | | |
|---|---|---|---|---|
| DE | 102006002119 | A1 | 7/2006 | |
| DE | 102006003023 | A1 | 7/2007 | |
| DE | 202012008326 | U1 | 12/2013 | |
| DE | 102013020418 | A1 * | 6/2015 | E05B 81/06 |
| DE | 102014105875 | A1 * | 10/2015 | B60R 25/24 |
| DE | 102014016787 | A1 * | 5/2016 | E05B 63/0065 |
| DE | 102017124525 | A1 | 4/2019 | |
| DE | 102017125710 | A1 | 5/2019 | |
| DE | 102017125719 | A1 | 5/2019 | |
| EP | 0589158 | A1 | 3/1994 | |
| EP | 1267022 | B1 | 7/2006 | |

* cited by examiner

MOTOR VEHICLE LOCK, IN PARTICULAR MOTOR VEHICLE DOOR LOCK

This application is a national phase of International Application No. PCT/DE2020/100673 filed Jul. 28, 2020, which claims priority to German Application No. 10 2019 121 300.2 filed Aug. 7, 2019, the entire disclosures of which are hereby incorporated by reference.

FIELD OF DISCLOSURE

The invention relates to a motor vehicle lock, in particular a motor vehicle door lock, comprising an electromotive drive for an actuation lever chain, in particular a locking lever chain, and an emergency energy store for providing electrical power to the drive in the event of emergency actuation, in particular emergency unlocking.

BACKGROUND OF DISCLOSURE

The motor vehicle lock or motor vehicle door lock described above usually has a locking mechanism consisting of a catch and a pawl, which locking mechanism can be opened by a motor by virtue of the electromotive drive via the actuation lever chain. This process is referred to as "electrical opening" and is well known, for which reference is made to the applicant's DE 10 2017 124 525 A1 by way of example only. To open the locking mechanism electrically, the signal from an outside door handle or inside door handle is evaluated at this point by virtue of a sensor located there. The actuation of the sensor is detected by virtue of a control unit and ensures that the electromotive drive lifts the pawl from its engagement with the catch via a release lever as an actuation lever chain.

In the case of the motor vehicle door lock described by DE 10 2017 124 525 A1, a mechanical actuation element for emergency actuation of the electromotive drive is also provided. By virtue of this mechanical actuation element for emergency actuation, actuation of the locking mechanism should be possible and carried out unchanged even if the drive has failed. This usually corresponds to an emergency locking of the locking mechanism in order to ensure that the associated motor vehicle door is closed. This has proven successful in principle.

In the generic state of the art according to DE 10 2017 125 719 A1, the additional emergency energy store is provided as an alternative to the mechanical actuation element for emergency actuation of the drive element according to DE 10 2017 124 525 A1. By virtue of the emergency energy store, the drive is supplied with the required electrical energy in the event of emergency actuation or emergency unlocking. In this case, the actuation lever chain is designed as a locking lever chain and, during normal operation, ensures that the associated motor vehicle lock assumes at least the "unlocked" and "locked" positions.

If, in this case, the electromotive drive fails and the locking lever chain cannot be transferred from its assumed "locked" position into the "unlocked" position, a switch is made to a so-called emergency actuation mode. This requires a positive check of a user's authentication. As a result of this, the electromotive drive supplied with electrical energy by virtue of the emergency energy store ensures that the lock is transferred from its locked position to an unlocked position or vice versa in this emergency actuation mode. That has also proven successful.

In the case of the known teaching according to DE 10 2017 125 719 A1, the emergency actuation device implemented there is equipped with a plurality of obligatory components. This includes not only the emergency energy store, but also an additional communication unit for communication with an ID transmitter of an electronic unit for controlling the lock and finally a device for energy management or an energy management system in order to be able to determine the state of charge of the emergency energy store. By virtue of the emergency energy store, not only the electronic unit and the communication unit are supplied with electrical energy in the event of a failure of the main power source (the battery permanently installed in the vehicle), but also an unspecified lock drive. It is also possible to work with an external energy store that can be connected via a power connection as an emergency energy store. It is therefore not necessary to charge the emergency energy store from the motor vehicle. Nevertheless, the known solution is structurally relatively expensive.

This also applies to a further procedure belonging to the state of the art according to DE 10 2006 002 119 A1. In this case, a locking system is described in which a signal for unlocking and/or locking an associated lock is transmitted again between a key and a transmitter/receiver. In addition, energy can be transmitted from the key to the lock. As a result, the lock can be activated in an emergency, in particular in the case of an electric door lock. The energy transfer can be realized and implemented by virtue of electrical contacts or also by means of inductive transfer via coils.

SUMMARY OF DISCLOSURE

The state of the art has basically proven successful when it comes to linking the emergency actuation to an upstream authentication check. However, the previous solutions are complex mechanically and in terms of circuitry, because the lock drive that has been implemented usually works in reverse and consequently has to be moved back by a motor after an emergency operation. This results in a structurally complex structure and increased energy consumption, which is disadvantageous in particular in emergency operation because in this case the emergency energy store must be dimensioned unnecessarily large or, if the emergency energy store is not fully charged, there is still a problem and the emergency actuation cannot be carried out or cannot be carried out completely. The invention as a whole seeks to remedy this.

The invention addresses the technical problem of further developing such a motor vehicle lock and in particular a motor vehicle door lock in such a way that a structurally simple emergency actuation is provided, having an energy consumption which is reduced compared to the state of the art.

To solve this technical problem, a generic motor vehicle lock and in particular motor vehicle door lock within the scope of the invention is characterized in that the drive for emergency actuation and in particular emergency unlocking acts on the actuation lever chain and in particular on the locking lever chain against the force of a restoring spring. In addition and according to an advantageous embodiment, the drive works unidirectionally.

In addition, the procedure is usually such that the drive is equipped with a high-ratio gear, for example a thread gear. In this context, it has also proven to be advantageous if the gear works on a lever of the actuation lever chain via a flexible connecting means. In the case of an implemented thread gear, the flexible connecting means can be the thread that is provided anyway as a component of such a thread gear.

Furthermore, a structurally simple construction is favored by the fact that the lever is equipped with a freewheel as part of the actuation lever chain and in particular the locking lever chain. In this way, the drive can act on the lever in question for emergency operation. In contrast, the drive returns without force or without additional loading of the drive, namely by the previously tensioned restoring spring.

A particularly simple and cost-effective variant is also characterized in that the drive, optionally including an emergency energy store, is designed as an attachment module for a lock housing. This means that in this case the drive and usually also the emergency energy store define a structural unit, namely the attachment module, which is attached to a lock housing that is present in any case. The attachment module in question can be detachably connected, so that the attachment module can be retrofitted if necessary.

In addition, it has proven successful that an authentication check of an operator takes place before the emergency actuation. The procedure can be comparable to that described in detail in the state of the art according to DE 10 2017 125 710 A1, which has already been referred to and forms the generic type. In fact, the design is usually such that the operator wishing to gain access has an ID transmitter and, in particular, an electronic key. In the event of the authentication check, communication now takes place between the electronic key and a control unit or control device on the motor vehicle. The control unit or the control device is supplied with the necessary electrical energy by virtue of the emergency energy store. In addition, the emergency energy store ensures that, after a positive authentication check by the operator, emergency actuation can take place as outlined.

For this purpose, it is only necessary that the electromotive drive for the actuation lever chain and in particular the locking lever chain is acted upon unidirectionally, namely in such a way that the lever is usually transferred from its assumed "locked" position into the "unlocked" position. In this case, the actuation lever chain is designed as a locking lever chain, and the lever is designed as a locking lever.

Due to the unidirectional design of the electromotive drive, it can be realized and implemented mechanically in a particularly simple and cost-effective manner. In this context, the combination of the electromotive drive with the restoring spring ensures that after the lever in question has been acted upon by virtue of the unidirectional drive, both the lever and the drive are moved back. For this purpose, the restoring spring is initially tensioned in the event of the actuation of the lever and then, after the electromotive drive has been switched off, ensures that the drive and the lever are moved back to their initial position.

Such a procedure is necessary and is realized according to the invention in a particularly simple manner by the restoring spring implemented, because after the end of the emergency operation, the motor vehicle lock in question must be returned to its initial position. In addition to the emergency unlocking described above and preferably implemented, an emergency locking is also possible and conceivable. This emergency locking can be carried out by virtue of a mechanical actuation element. This mechanical actuation element may be an actuation nut for emergency locking. This actuation nut can be arranged in the inlet region of the motor vehicle lock, so that the motor vehicle lock can be transferred from its "unlocked" position into the "emergency locked" position by virtue of the actuation nut when the motor vehicle door is open and associated. Such a procedure is known in principle from DE 20 2012 008 326 U1, EP 1 267 022 B1, or also DE 88 09 256 U1, but not in connection with an additional emergency unlocking.

As a result, a motor vehicle lock and in particular a motor vehicle door lock is provided, which provides and implements an emergency actuation or emergency unlocking of simple construction. In fact, such an emergency unlocking is necessary if the electromotive drive working on the locking lever chain in such a case is malfunctioning and the locking lever chain in the example remains in its consistently assumed "locked" position. The invention is based on the finding that the "locked" state of the locking chain is typically not only assumed when the motor vehicle is parked, but for safety reasons also while driving.

In order to nevertheless provide access for the operator wishing to gain access, in particular when the motor vehicle is parked and the electrical energy supply has collapsed, for example, an authentication check is first carried out according to the invention. In order to realize this in such a case, the emergency energy store is provided, which supplies the control device or the control unit with the required electrical energy, so that the authentication check then takes place, in which the control unit communicates, for example, with an operator-side key or generally an ID transmitter. After a positive authentication check of the operator wishing to gain access, the emergency energy store then ensures that the electromotive drive is acted upon in order to transfer the locking lever chain from its assumed "locked" state to the "unlocked" position. Only then can an associated locking mechanism, for example a catch and pawl, be opened mechanically by virtue of an additionally provided actuation lever mechanism.

In principle, electrical opening is also possible in such a way that, in this case, the emergency energy store acts on the electromotive drive for the actuation lever mechanism. It is generally possible to work with a "single" electromotive drive, which acts on the locking lever chain, for example to move it to one of the "unlocked" as well as "locked" positions, and also provides for the described emergency opening. As a rule, however, an additional electromotive drive is provided, which comprises the emergency energy store in most cases and defines the attachment module described for the lock housing. By resorting to a unidirectional drive for the emergency actuation in conjunction with the obligatory restoring spring, the attachment module in question can be constructed in a particularly simple manner. As a result, the additional weight associated with such an attachment module is manageable. The associated costs are also low so that, compared to the state of the art, particular advantages are observed with regard to the simplified structural design and the reduced production costs. Herein lie the essential advantages.

The invention is explained in greater detail below with reference to drawings which show only one exemplary embodiment. In the drawings:

DETAILED DESCRIPTION

Figure 1:
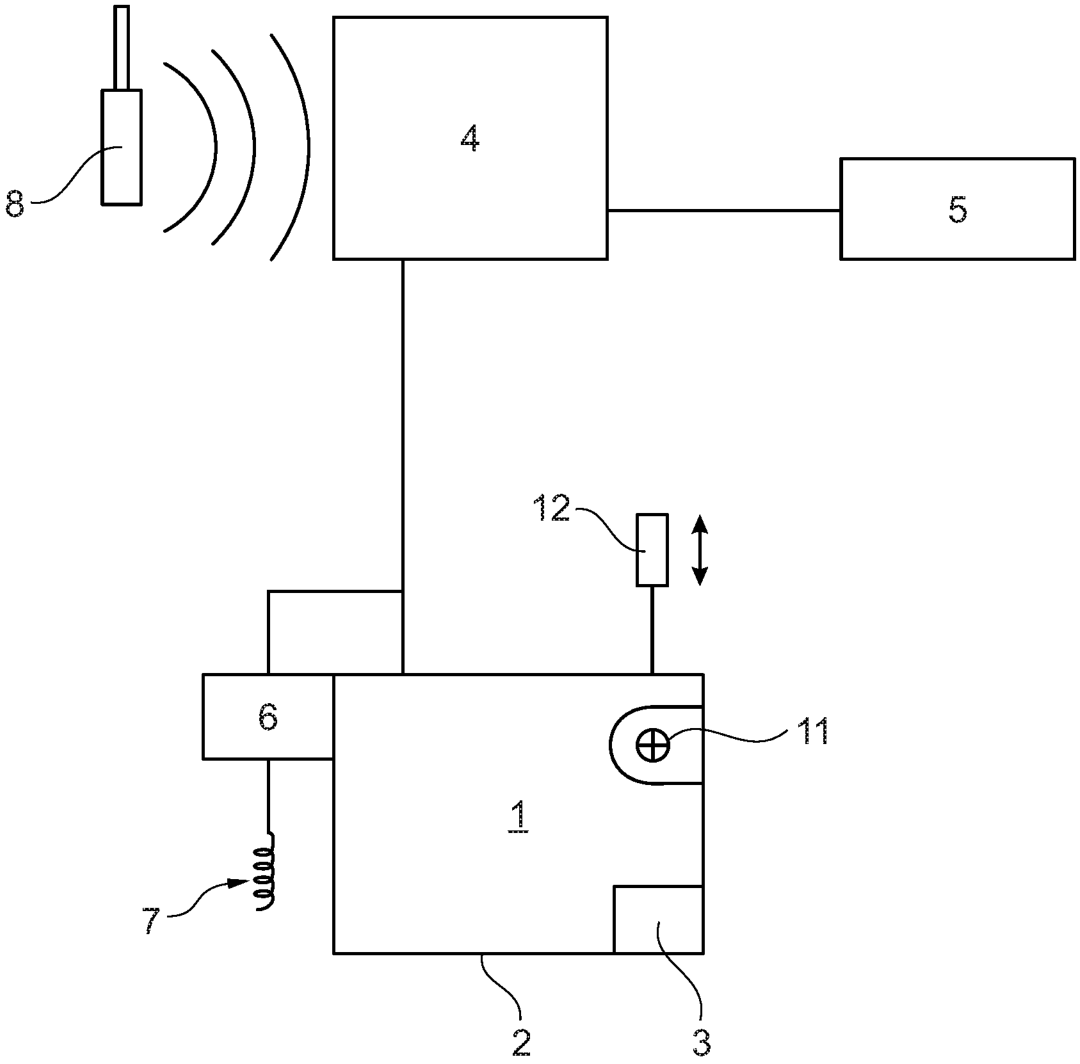
FIG. 1 shows the motor vehicle lock according to the invention in the form of a motor vehicle lock in a schematic overview.

In the drawings, a motor vehicle lock is shown, which is a motor vehicle door lock 1 within the scope of the exemplary embodiment and is not limited to this. For this purpose, the motor vehicle door lock 1 has a lock housing 2, inside which, for example and without limitation, a locking mechanism consisting of a catch and a pawl with the usual functionality is arranged. In addition, inside the housing 2 or the motor vehicle door lock 1, there is an actuation lever chain 3, which is indicated only schematically according to the exemplary embodiment in FIG. 1. The actuation lever chain 3 is designed in the exemplary embodiment and not restrictively as a locking lever chain and in particular a central locking chain.

In the overview according to FIG. 1, a motor vehicle-side control device or control unit 4 can also be seen. In addition, an emergency energy store 5 for providing electrical power to a drive 6 for the actuation lever chain or locking lever chain 3. The drive 6 acts on the locking lever chain 3 against the force of a restoring spring 7 in the event of an emergency unlocking to be described in more detail below.

However, before such an emergency unlocking occurs, an authentication check is carried out for an operator wishing to gain access. For this purpose, the operator wishing to gain access has a key 8 on the operator side. In the event of an emergency operation or emergency unlocking, the energy store 5 ensures that the control device or the control unit 4 is supplied with the required electrical energy, so that a preferably wireless (and indicated in FIG. 1) communication between the control unit 4 and the operator-side key 8 can take place.

In the event of this wireless or wired communication between the key 8 on the operator's side and the control unit 4 supplied with the aid of the emergency energy store 5, data are exchanged, by virtue of which the authorization of the operator carrying the key 8 on the operator's side is checked. If this authentication check of the operator is completed positively, the energy store 5 then ensures that the electromotive drive 6 is energized by virtue of the energy store 5 in order to transfer the locking lever chain 3 from its assumed "locked" position to the "unlocked" position.

For this purpose, the energy store 5 is connected to the control unit 4, and the control unit 4 in turn ensures that the electromotive drive 6 is acted upon if the authentication check has been completed positively. In the event of this emergency unlocking, the unidirectional drive 6 acts on the actuation lever chain or locking lever chain 3 against the force of the restoring spring 7. In detail, the drive 6 works on a lever 3*a* as part of the locking lever chain 3 via a downstream gear 9, 10 shown in detail in FIG. 2.

The gear 9, 10 is a high-ratio gear 9, 10, i.e. one that directly transmits rotations of an output shaft 9 of the electromotive drive 6 or an electric motor 6 implemented at this point to the lever 3*a* according to the exemplary embodiment, because the gear 9, 10 is a thread gear. This has a thread 10 wound on the output shaft 9, which thread converts the rotations of the output shaft 9 and consequently of the electric motor 6 directly into a shortening of the thread 10 indicated in FIG. 3. The shortening of the end of the thread 10 acting on the pivotable lever 3*a* with each revolution of the output shaft 9 results, as shown in the detail view in FIG. 3, in the lever or locking lever 3*a* ultimately being transferred from its "locked" position shown in dashed lines to the "unlocked" position shown in solid lines. This process may take several seconds due to the number of revolutions of the electric motor 6 corresponding to the pivoting path in question, but this is acceptable for the emergency operation or emergency unlocking described here. This is because the implemented high transmission ratio of the gear 9, 10 or the thread gear 9, 10 implemented by way of example corresponds to the fact that the drive 6 or electric motor can work with low currents. As a result, the emergency energy store 5 is only slightly loaded or an emergency energy store 5 with a small capacity can be used.

As a result, there is also the possibility that the electric motor 6 and the restoring spring 7 together with the energy store 5 define, as a whole, an attachment module 5, 6, 7 or 6, 7 indicated in FIG. 1, which energy store can be attached as a structural unit to the lock housing present there. However, the attachment module 5, 6, 7 in question can also only comprise the electric motor 6 and the associated restoring spring 7.

Figure 2:
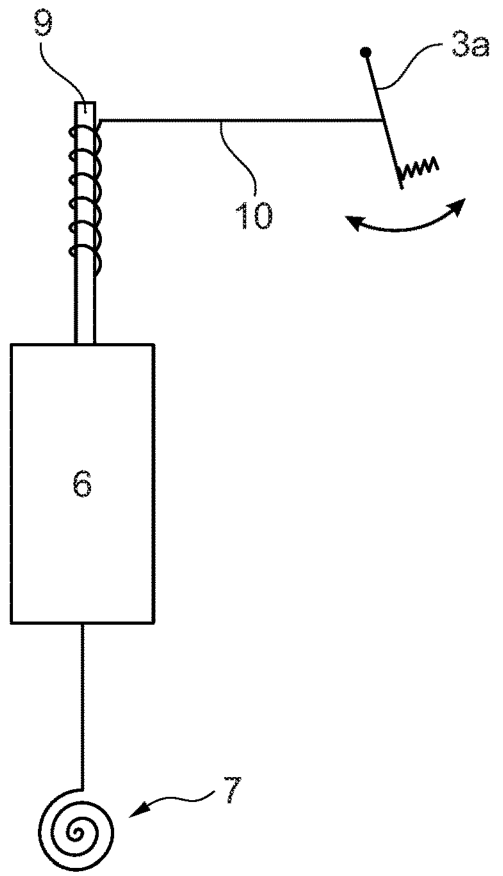
FIG. 2 shows the electromotive drive in detail.
Figure 3:
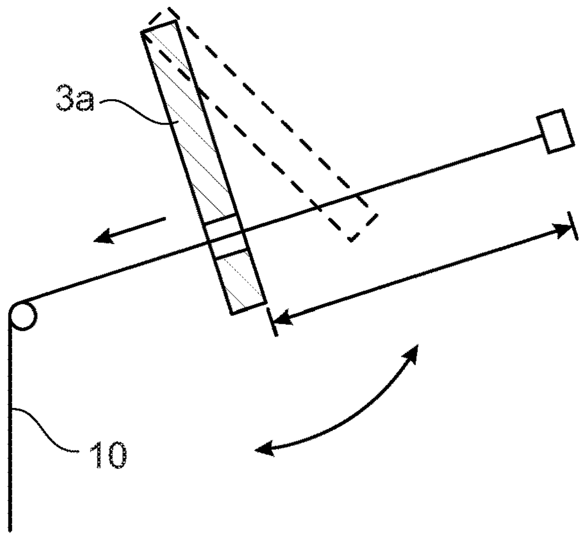
FIG. 3 shows a further detail from the object of FIG. 2.

A comparison of FIGS. 2 and 3 also reveals that the gear 9, 10 works via a flexible connecting means 10 on the lever 3*a* as part of the locking chain 3. According to the exemplary embodiment, the flexible connecting means 10 and the thread 10 as part of the thread gear 9, 10 coincide, so that the structural design is particularly simple.

The fact that the drive 6 works unidirectionally also contributes to this, i.e. it can transfer the lever 3*a* from its "locked" position shown in dashed lines into the "unlocked" position shown in solid lines only in the direction indicated in FIG. 3, as an additional arrow drawn there makes clear.

In contrast, the return movement of the lever 3*a* and also of the drive 6 or the electric motor takes place by virtue of the restoring spring 7. For this purpose, the restoring spring 7 may be in the form of a spiral spring which is connected at one end to a rear extension of the output shaft 9 of the electric motor 6, whereas the other end of the restoring spring 7 or the spiral spring implemented in this context may be connected in a stationary manner, for example to the housing 2 of the motor vehicle door lock 1.

A comparison of FIGS. 2 and 3 also shows that the lever 3*a* is equipped with a freewheel. This means that it is only possible to act on the lever 3*a* so as to pull it from its position shown in dashed lines to the position shown in solid lines. The reverse movement of the lever 3*a*, on the other hand, may be ensured by an indicated spring associated with the lever 3*a*. On the other hand, after the described emergency unlocking, the restoring spring 7 ensures that the thread 10 previously wound up on the output shaft 9 during this process is unwound again. This means that the drive 6 acts on the lever 3*a* for emergency unlocking, while its return takes place without force, namely while being acted upon by the previously tensioned restoring spring 7 which can relax after the end of the emergency unlocking and thereby resets the motor and specifically unwinds the thread 10 from the output shaft 9.

In addition, an actuation element 11 is also shown in FIG. 1. The actuation element 11 may be a mechanical actuation element 11 and specifically an actuation nut 11 that can be acted upon, for example, with a tool, a key, a screwdriver, etc. According to the exemplary embodiment, the actuation nut 11 is located in the inlet region of the motor vehicle door lock 1. As a result, the actuation nut 11 is accessible when the motor vehicle door is open. If the motor vehicle lock 1 assumes the "unlocked" state of the locking lever chain 3 because the electromotive drive 6 is faulty, emergency locking can be ensured in this case and additionally by virtue of the mechanical actuation element or the actuation nut 11. For this purpose, the mechanical actuation element or the actuation nut 11 works on the lever 3*a* in such a way that it is transferred from the assumed "unlocked" position shown in solid lines to the "locked" position shown in dashed lines. At the same time, a locking button 12 may be moved accordingly, which is only shown for the sake of a simpler illustration. The actuation nut 11 is of course not necessary for the functionality described above in the event of the emergency unlocking.

LIST OF REFERENCE SIGNS

1 Motor vehicle door lock
2 Lock housing
3 Actuation lever chain
3*a* Lever
4 Control unit
5 Emergency energy store
6 Drive
7 Restoring spring
8 Key
9 Thread
10 Output shaft
11 Actuation nut

The invention claimed is:

1. A motor vehicle lock comprising:

an electromotive drive for an actuation lever chain;

a restoring spring;

a lock housing that houses a locking mechanism and the actuation lever chain; and an emergency energy store for providing electrical power to the electromotive drive in the event of an emergency actuation for emergency unlocking, wherein the electromotive drive for emergency actuation for emergency unlocking acts on the actuation lever chain against a force of the restoring spring, wherein the electromotive drive is equipped with a high-ratio gear comprising an output shaft and a flexible connector wound on the output shaft, wherein the restoring spring works directly on the output shaft, wherein the electromotive drive, the emergency energy store, and the restoring spring define an attachment module which is attached to the lock housing, and wherein the attachment module is detachable from the lock housing.

2. The motor vehicle lock according to claim 1, wherein the high-ratio gear works via the flexible connector on a lever of the actuation lever chain.

3. The motor vehicle lock according to claim 1, wherein the electromotive drive is unidirectional.

4. The motor vehicle lock according to claim 1, wherein the actuation lever chain is equipped with a freewheel.

5. The motor vehicle lock according to claim 1, wherein the electromotive drive acts on the actuation lever chain for emergency unlocking, while a return of the actuation lever chain takes place without force from the electromotive drive.

6. The motor vehicle lock according to claim 1, further comprising a control unit, wherein the control unit makes an authentication check in response to an operator input before the emergency actuation for the emergency unlocking.

7. The motor vehicle lock according to claim 6, wherein the emergency energy store supplies the control unit with electrical energy for the authentication check.

8. The motor vehicle lock according to claim 7, wherein the control unit communicates with a key used by the operator to provide the operator input.

9. The motor vehicle lock according to claim 8, wherein communication between the control unit and the key is wireless.

10. The motor vehicle lock according to claim 1, wherein the actuation lever chain is a locking lever chain.

11. The motor vehicle lock according to claim 1, wherein the high-ratio gear is a thread gear.

12. The motor vehicle lock according to claim 1, wherein the restoring spring is initially tensioned by actuation of the actuation lever chain via actuation of the output shaft of the electromotive drive, and then after the electromotive drive has been switched off, the restoring spring returns the electromotive drive and the actuation lever chain back to their initial position.

13. The motor vehicle lock according to claim 1, wherein for the emergency unlocking, the electromotive drive acts on a lever of the actuation lever chain via a downstream gear.

14. The motor vehicle lock according to claim 1, wherein the restoring spring is a spiral spring which is connected at one end to a rear extension of the output shaft of the electromotive drive, and connected at another end to a housing of the motor vehicle door lock.

15. The motor vehicle lock according to claim 1, further comprising a mechanical actuation element for manually operating the actuation lever chain.

16. The motor vehicle lock according to claim 15, wherein the mechanical actuation element is an actuation nut that is manually operable by a tool.

* * * * *